Sept. 24, 1968 J. W. HOLDEMAN 3,402,798

DIFFERENTIAL MECHANISM

Original Filed July 29, 1965 4 Sheets-Sheet 1

INVENTOR
JOHN W. HOLDEMAN

BY John W Butcher

ATTORNEY

Sept. 24, 1968   J. W. HOLDEMAN   3,402,798
DIFFERENTIAL MECHANISM
Original Filed July 29, 1965   4 Sheets-Sheet 2
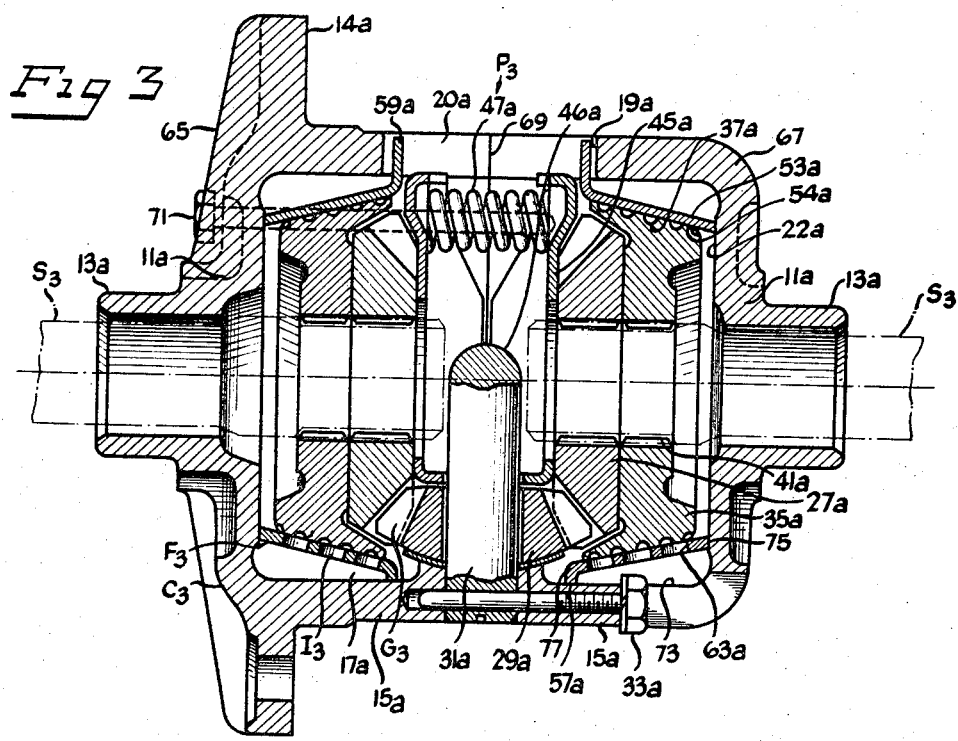
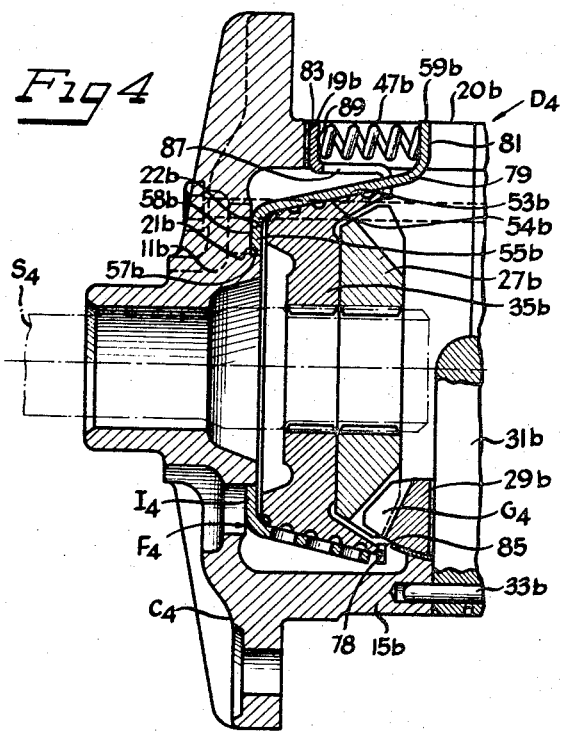
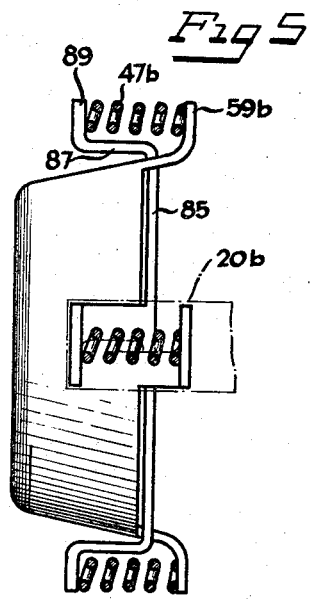
INVENTOR
JOHN W. HOLDEMAN
BY   John W Butcher
ATTORNEY

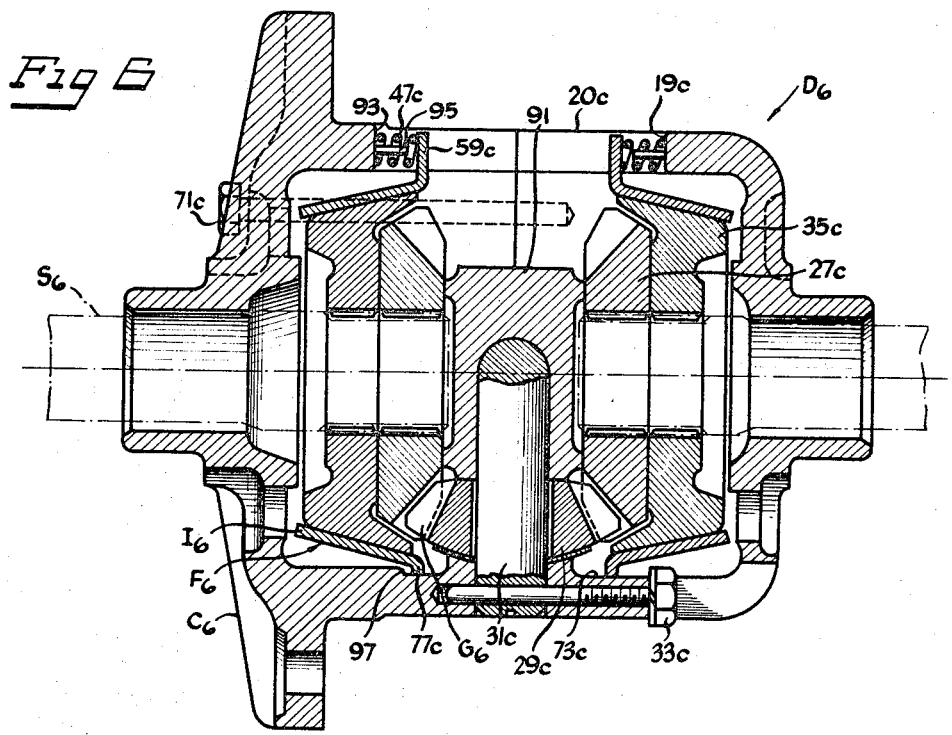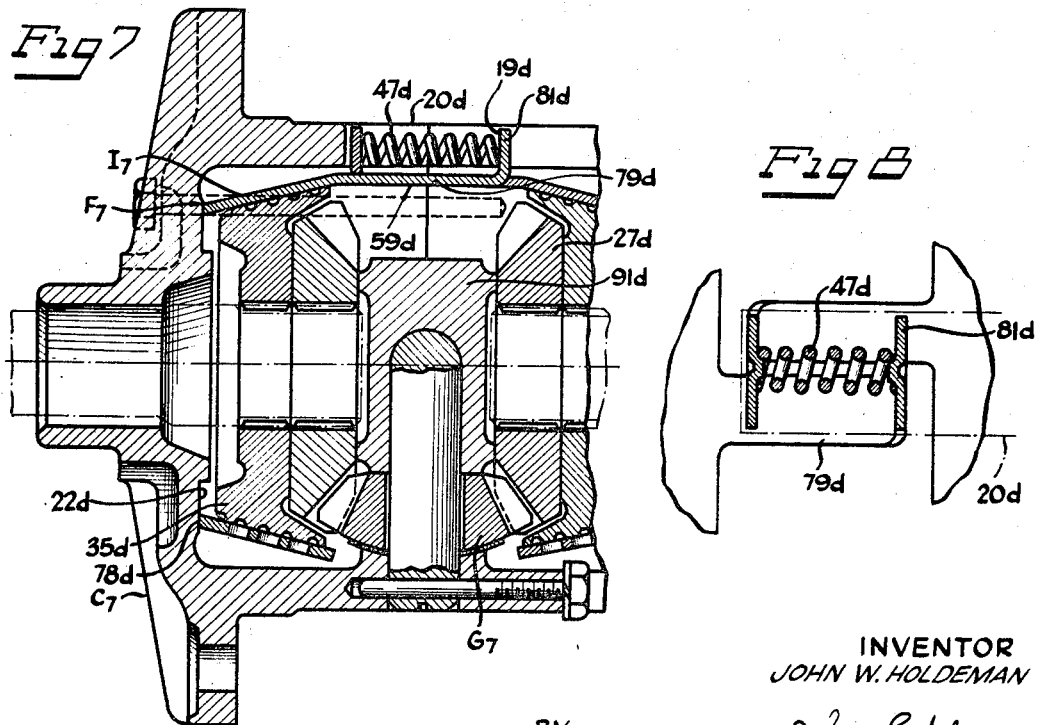

United States Patent Office 3,402,798
Patented Sept. 24, 1968

3,402,798
DIFFERENTIAL MECHANISM
John W. Holdeman, Auburn, Ind., assignor to Borg-Warner Corporation, a corporation of Illinois
Original application July 29, 1965, Ser. No. 475,811, now Patent No. 3,327,560, dated June 27, 1967. Divided and this application May 10, 1967, Ser. No. 655,967
7 Claims. (Cl. 192—107)

ABSTRACT OF THE DISCLOSURE

An insert for a limited slip differential mechanism defining a conical clutch seating surface. The insert includes means for radial and axial positioning of the insert as well as for providing driving engagement between the insert and the mechanism casing.

---

The present invention is a divisional application of Ser. No. 475,811, now Pat. No. 3,327,560 filed July 29, 1965, entitled Differential Mechanism.

This invention relates to limited slip differential mechanisms which provide a predetermined resistance to differential action. More particularly, it relates to limited slip differential mechanisms which utilize conically shaped clutch members to provide the resistance to free differentiation.

It is the principal object of the present invention to provide an improved form of limited slip differential mechanism utilizing a conically shaped clutch to resist differentiation.

It is a further object of the present invention to provide an improved form of limited slip differential mechanism utilizing conically shaped clutches to resist differentiation wherein the machining of conically shaped cone seat surfaces on the interior of the mechanism casing is eliminated.

It is another object of the present invention to provide an improved form of limited slip differential mechanism of the type described which includes separate removable inserts which form the conically shaped cone seat surfaces.

It is another object of the present invention to provide a limited slip differential mechanism utilizing conical clutch members to resist differential action having separate cone seat inserts wherein the inserts include at least one radially directed drive tab adjacent their divergent end which provides a driving engagement between the inserts and the differential case.

It is another object of the present invention to provide a removable cone seat insert for a limited slip differential mechanism.

It is a still further object of the present invention to provide a subassembly for a limited slip differential mechanism which includes a revolvable cone seat insert and a conical clutch member which are maintained in an initial predetermined frictional engagement.

These and other objects of the present invention will become apparent with reference to the following description and the accompanying drawings.

In the drawings:

FIGURE 3 is a revolved cross-sectional elevational view of a differential mechanism constructed in accordance with the present invention showing an alternate arrangement for radially and axially positioning the inserts with respect to the differential casing;

FIGURE 4 is a fragmentary, revolved sectional view of a differential mechanism incorporating various of the features of the present invention showing an alternate arrangement for providing an initial preload upon the clutch members;

FIGURE 5 is a view partially in section of a portion of the apparatus of FIGURE 4 illustrating various particular features of that embodiment of the invention;

FIGURE 6 is a fragmentary, revolved, sectional view of a differential mechanism substantially similar to the mechanism of FIGURE 3 showing an alternate form of biasing means to provide the initial preload upon the clutch members;

FIGURE 7 is a revolved sectional view of a differential mechanism constructed in accordance with the present invention showing an alternate arrangement for providing an initial preload upon the clutch members;

FIGURE 8 is a fragmentary top view of a portion of the apparatus of FIGURE 7 showing various other of the features of the invention;

Very generally, the present invention is directed to a differential mechanism utilizing cone shaped clutch members to resist differential action between output shafts. The clutch members include separate removable inserts which form conically shaped cone seat surfaces associated with the mechanism casing and provide the frictional surfaces for engagement of complementary clutch members associated with the output shafts.

A driving relationship between the insert and the casing is necessary to provide the clutches with the required ability to transmit rotational effort from the differential casing to the output shafts independently of the bevel gear system of the mechanism. In accordance with the present invention, and as shown in each embodiment thereof, this relationship is provided by engagement of the differential casing by radially directed upstanding drive tabs formed upon the inserts adjacent the divergent end of the conical seat surfaces.

Figure 1:
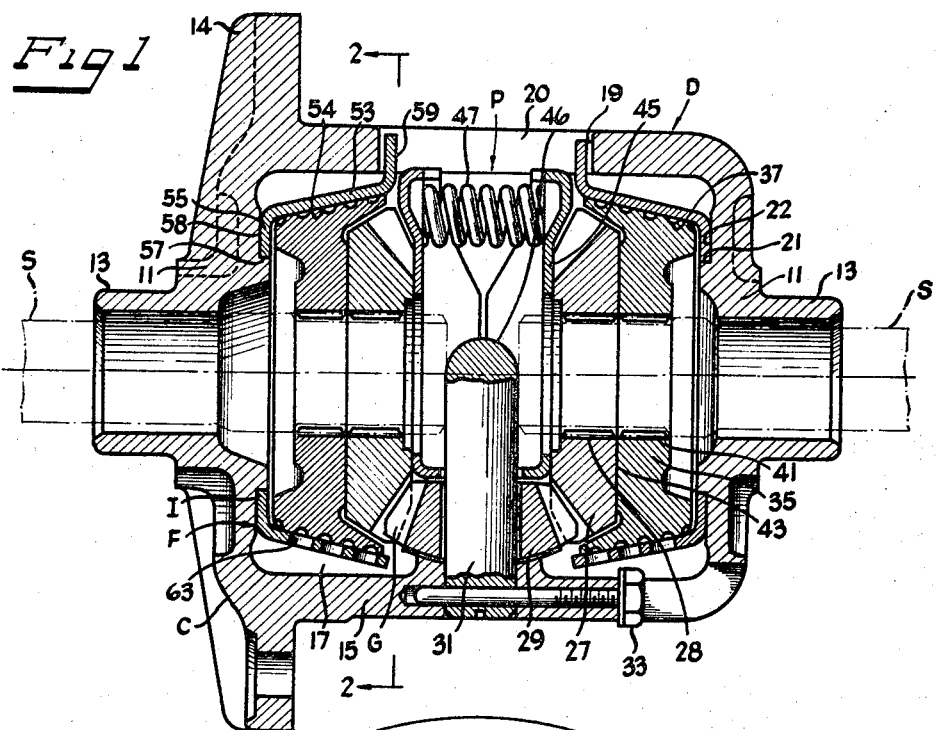
FIGURE 1 is a revolved cross-sectional elevational view of a differential mechanism constructed in accordance with the present invention showing various of the features thereof.
Figure 2:
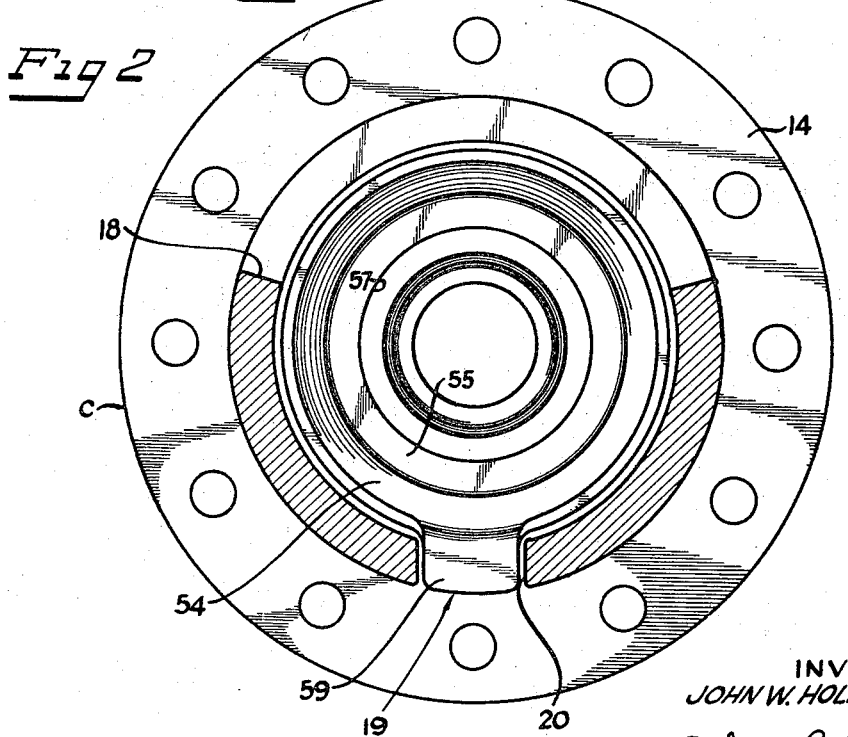
FIGURE 2 is a fragmentary, cross-sectional view of the apparatus of FIGURE 1 taken substantially along the line 2—2 of FIGURE 1.

Referring now to the drawings, and particularly to the embodiment of FIGURES 1 and 2, there is shown a differential mechanism generally designated D disposed in operative association with a pair of coaxially aligned relatively rotatable output shafts S. These shafts may form the driving axle of an automotive or commercial vehicle, farm tractor, or any other device which requires distribution of torque to two utilization points where relative movement between shafts occurs under certain operating conditions.

The mechanism D includes a casing C surrounding adjacent ends of the output shafts S which casing is adapted to receive input torque from a drive line system (not shown). A bevel gear system generally designated G is connected between the casing C and the shafts S and transmits rotational effort to the shafts while simultaneously allowing relative rotation between them when required, as when an automotive vehicle negotiates a corner.

A pair of friction clutches F provide the desired resistance to differential action. Each clutch includes a friction surface associated with the casing C and a friction surface associated with one of the output shafts S. Frictional engagement of these surfaces provides a direct path for transmission of rotational effort from the casing to the output shafts independent the bevel gear system G.

The clutches thus overcome the inherent ability of the mechanism to allow differentiation between shafts and torque is transmitted to both shafts even though they may experience unequal loading.

The friction surfaces of the clutch F are maintained in engagement by a spring pack P which provides an initial preload to insure that at least a predetermined minimum resistance to differential action exists.

Each of the clutches F includes a removable insert I which is connected to the casing C for rotation therewith and which forms the friction surface of the clutch F associated with the casing C.

More specifically, and as best seen in FIGURE 1, the differential casing C is integrally formed as by casting, and may be constructed of any suitable material such as, for example, malleable iron.

The casing C includes a pair of spaced apart, generally parallel transverse walls 11 each of which includes a longitudinally elongated hub 13 adapted to receive one of the output shafts S. The hubs do not journal the shafts S, but rather support ball or roller bearings (not shown) which position the mechanism within the axle assembly.

One of the transvesre walls 11 is provided with a radially directed flange 14 to which is secured a ring gear (not shown) adapted to receive input torque from the associated drive line system.

The transverse walls are connected by a longitudinally extending, generally cylindrical wall 15 which defines, with the walls 11, an internal cavity 17 surrounding the adjacent ends of the output shafts.

The cylindrical wall 15 is provided with a side port 18 defining a relatively large access opening. This side port allows lubricant to enter the cavity for lubrication of both the bevel gear system G and the clutches F and is utilized for assembly of the mechanism. A second side port or slot 19, circumferentially spaced from the side port 18, is provided which includes a pair of longitudinally directed side wall surfaces 20 which define the circumferential width of the port 19 (see FIGURE 2).

The interior surface of each of the transverse walls 11 is provided with a generally cylindrical pilot surface or shoulder 21 disposed coaxially of the longitudinal axis of the shafts S and the hubs 13. The side wall 11 extends radially outwardly from the shoulder 21 to form an axial stop surface 22. The shoulder 21 and the axial stop 22 act to position the insert I within the cavity 17, as will be explained.

Referring now to the bevel gear system G, best seen in FIGURE 1, there is provided an arrangement which transmits output torque to the shafts S and simultaneously allows relative rotation between shafts when necessary, as when a vehicle is cornering.

The bevel gear system includes a pair of side gears 27, each of which is connected to one of the shafts S for rotational movement therewith and axial movement thereon. To effect this relationship between the shafts and side gears, the adjacent ends of the shafts S and the internal bore of the gears are splined as at 28.

The side gears are in constant mesh with a pair of pinion gears 29 supported by a transversely extending pinion pin 31 disposed intermediate the adjacent ends of the shafts S and secured to the casing C for rotation therewith by retainer screw 33.

As can be appreciated, rotation of the differential casing C by the drive line system causes the pinion pin 31 to revolve about the centerline of the shafts S. The pinion gears 29, therefore, transcribe a generally cylindrical path about the axis of the shafts, and as they are in mesh with the side gears 27, the side gears are caused to rotate and thereby transmit torsional effort to the output shafts S.

If one of the output shafts is required to rotate at a different speed from the other, as when cornering, the pinion gears 29 not only revolve about the longitudinal axis of the output shafts, but also rotate about the pinion pin 31 allowing relative movement between the side gears 27. Consequently, the output shafts S rotate relative to each other as well as relative to the casing C.

Differentiation, i.e., relative rotation between the shafts, inherently possible by virtue of the above described structure, is resisted by the engagement of the friction surfaces of the clutches F. Each of these clutches includes a frusto-conical clutch member 35 and one of the cone seat inserts I frictionally engaged by the member 35 along a complementary conical surface.

A spirally progressing groove 37 is provided in the conical surface of the clutch member 35 for distribution of oil or other lubricant to the frictionally engaged surfaces.

Each clutch member 35 includes an internally splined bore 41 connected to one of the shafts S and is, therefore, rotatable with the shaft and axially movable thereon. Each of the clutch members 35 is disposed between one of the transverse walls 11 of the casing C and one of the side gears 27. The respective side gear 27 and the clutch member 35 on each shaft S are in radial contact along the surface 43 and movement of either of these members toward the other, therefore, causes a corresponding movement of the other element in the same direction.

Application of axial force upon the side gears and consequently upon the clutch members 35 is accomplished in two ways; first, initial frictional engagement of the clutch members 35 with the drum or seat surfaces of the inserts I is provided by the spring pack P. The spring pack generally surrounds the transverse pinion pin 31 and includes a pair of gear contacting members 45, each of which is in contact with one of the side gears 27 adjacent the pinion pin. Each of the gear contacting members includes axially extending flanges having openings 46 to provide clearance for the pinion pin 31. A plurality of compressed coil springs 47 extend longitudinally between the contacting members 45 and urge them axially outwardly. This axial loading is transmitted to the side gears which are axially movable on the shafts S. The side gears, in turn, transmit the axial force to the clutch members 35, which are also splined to the shafts S and consequently are free to move axially into frictional engagement with the conical friction surfaces on the insert I.

Secondly, the initial frictional engagement of the clutch member 35 with the insert I, provided by the spring pack P, is increased generally as a function of the torsional input to the mechanism casing C, by the bevel gear system G.

Application of torque to the mechanism creates axial separating forces upon the side gears 27 which forces are, in turn, transferred to the clutch members 35 to provide a cumulative increased frictional engagement of the clutches with the conical inserts I to resist differentiation.

As best seen in FIGURE 1, the conical drum or seat surfaces frictionally engaged by the clutch members 35 are provided by the removable cone seat inserts I which form the friction surfaces of the clutches F associated with the casing C. These inserts include a generally conically shaped wall portion 53, the interior of which includes a conical seat surface 54 engaged by the clutch member 35. The inserts I may be formed of any suitable material such as, for example, steel, and may be made by any one of several manufacturing processes, such as stamping, turning, spinning, grinding, etc.

The convergent end of the conical wall 53 of each insert is provided with an inwardly directed radial flange 55 terminating in a generally cylindrical pilot surface 57 having a diameter approximately equal to the diameter of the pilot shoulder 21, of the casing C. The insert is disposed within the differential casing with the pilot surface 57 overlying the shoulder 21 formed on the casing wall 11 to effect radial location of the insert with respect to the output shafts S and accordingly with respect to the clutch member 35.

Further, an outer surface 58 of the radial flange 55 of each insert is disposed in contact with one of the axial stop surfaces 22 to axially position the insert I with respect to the casing C and the clutch member 35. These stop surfaces fix the position of the inserts in relation to the clutch members and support them in opposition to the axial forces applied by the spring pack P and side gears upon torque application to effect the frictional engagement between the surface 54 and clutch members 35.

As can readily be appreciated, the inserts I must, of necessity, be retained in relatively stationary relationship with respect to the casing C in order to transmit rotational effort from the casing to the clutch member 35 for purposes of resisting differentiation.

This is accomplished by a radially directed tab 59 extending outwardly of the divergent end of the conical wall 53 of each of the inserts I. Each tab 59 is disposed between the longitudinal side wall surfaces 20 of the side port 19. Engagement of transverse ends of the tabs 59 with the surfaces 20 effects a driving engagement between the inserts and the drive casing C.

In the embodiment shown, only one such drive tab is provided upon each of the inserts I. Of course, this number could be varied, without departing from the scope of the invention and additional side ports or slots could be provided about the cylindrical wall 15 to accept the additional drive tabs. Also, the side ports need not have an axial length sufficient to receive both inserts as shown. A separate side port or slot could be provided for each insert.

Each insert I is provided with a plurality of lubricating orifices 63 to supply lubricant to the spirally progressing groove 37 of the clutch member 35. These orifices are disposed longitudinally along the insert conical wall 53 in one or more rows as desired. Lubricant from within the cavity 17 of the casing C may pass through these orifices into communication with the spiral grooves 37 for distribution to the frictionally engaged surfaces.

In assembling the mechanism, each of the inserts I is first placed in overlying relation to a clutch member 35. These components are then inserted through the side port opening 18 and positioned such that the cylindrical pilot surfaces 57 of the inserts properly engage the shoulders 21 of the casing and the outer surfaces of the radial flanges 55 contact the axial stop surfaces 22 with the tabs 59 disposed such that the transverse ends contact the longitudinal side wall surfaces 20 of the port 19 to provide a driving engagement between the inserts and the casing C. The side gears 27 are then placed in contacting relation with the clutch members 35 along the surfaces 43. Alternatively, the side gears and clutch members 35 could be integrally formed.

After the pinion gears are positioned in mesh with the side gears in 180° opposed facing relation, the bevel system is rotated to align the pinion gears with respect to the basing C for insertion of the pinion pin 31. The spring pack P is then compressed and installed through the side port with the gear contacting members engaging the side gears. The gear contacting members of the spring pack must be aligned so that the openings 46 are disposed for insertion of the pinion pin. The pin is then inserted through the pinion gears and spring pack and locked to the casing C with the retainer screw 33 to complete the assembly of the device.

Turing now to the embodiment of FIGURE 3, there is shown a modified arrangement for axially and radially positioning the inserts with respect to the differential casing.

In this embodiment, a casing $C_3$ is disposed in surrounding relation to the adjacent ends of a pair of coaxially aligned output shafts $S_3$. A bevel gear system, generally designated $G_3$ is operativey associated with the casing and shafts and provides a driving relation therebetween and allows relative movement between the shafts when necessary. Conical clutches $F_3$ are disposed within the casing to provide resistance to differential action. These clutches include cone seat inserts $I_3$ which define the conical surfaces associated with the casing and establish a frictional driving relation between the casing and shafts through the clutches $F_3$.

In this embodiment, the casing $C_3$ is formed by a pair of cooperating, generally cup-shaped sections comprising a flange section 65 and a cap section 67 which include generally cylindrical wall portions 15a disposed in abutting relation along a parting line 69. Of course, it is obvious that a single piece casing such as that shown in the embodiment of FIGURES 1 and 2 could be used without departing from the scope of the invention. These sections are retained in abutting relation as by bolts 71 with the exterior surface of the walls defining a portion of the exterior of the casing and interior surface of the walls defining a cavity 17a surrounding the adjacent ends of the output shafts $S_3$.

Each of the sections 65 and 67 includes a shaft opening defined by a longitudinally elongated hub 13a centrally disposed in a transverse wall 11a of that section which receives the shafts $S_3$.

A plurality of side ports 19a are provided which are formed by mating rectangular openings in the abutting ends of the casing sections. These side ports allow lubricant to enter the casing for lubrication of the bevel gear system $G_3$ and the clutches $F_3$ and serve other purposes, as will be explained shortly. Each of the openings in the respective casing halves includes a pair of spaced apart longitudinally extending side walls 20a. These walls define the width of the side ports.

The number of side ports used is optional. In the illustrated embodiment, it is contemplated four such side ports are provided, though one could effectively be used.

The flange section 65 of the casing $C_3$ includes a radially directed flange 14a extending about its exterior periphery to which is secured a ring gear (not shown) adapted to receive an input torque from the drive line system.

The interior surface of each of the transverse walls 11a is provided with an axial stop surface 22a which acts to axially position the insert $I_3$ within the cavity 17a. Further, the cylindrical wall portions 15a include longitudinally extending generally cylindrical surfaces 73 interiorly of the cavity 17a which serve to radially position the inserts within the casing $C_3$.

Referring now to the bevel gear system $G_3$, there is provided a pair of side gears 27a, each of which is connected to one of the shafts $S_3$ for rotational movement therewith and axial movement thereon. To effect this relationship between the shafts and side gears, the adjacent ends of the shafts $S_3$ and the internal bore of the gears are splined.

The side gears are in constant mesh with a pair of pinion gears 29a supported by a transversely extending pinion pin 31a disposed intermediate the adjacent ends of the shaft $S_3$ and secured to the casing $C_3$ for rotation therewith by retainer pin 33a.

As can be appreciated, rotation of the differential casing $C_3$ by the drive line system causes the pinion pin 31a to revolve about the centerline of the shafts $S_3$. The pinion gears 29a, therefore, transcribe a generally cylindrical path about the axis of the shafts, and as they are in mesh with the side gears 27a, the side gears are caused to rotate and thereby transmit torsional effort to the output shafts $S_3$.

If one of the output shafts experiences a greater resistance to rotation than the other, the pinion gears 29 not only revolve about the longitudinal axis of the output shafts, but also rotate about the pinion pin 31a allowing relative movement between the side gears 27a. Consequently, the output shafts $S_3$ rotate relative to each other as well as relative to the casing $C_3$.

Differentiation, i.e., relative rotation between the shafts, inherently possible by virtue of the above described structure, is resisted by the engagement of the friction surfaces of the clutches $F_3$. Each of these clutches includes a frusto-conical clutch member 35a and one of the cone seat inserts $I_3$ frictionally engaged by the member 35a along a complementary conical surface.

A spirally progressing groove 37a is provided in the conical surface of the clutch member 35a for distribution of oil or other lubricant to the frictionally engaged surfaces.

Each clutch member 35a includes an internally splined bore 41a connected to one of the shafts $S_3$ and is, therefore, rotatable with the shaft and axially movable thereon.

Initial frictional engagement of the clutch members 35a with the drum or seat surfaces of the inserts $I_3$ is provided by a spring pack $P_3$. The spring pack generally surrounds the transverse pinion pin 31a and includes a pair of gear contacting members 45a each of which is in contact with one of the side gears 27a adjacent the pinion pin. Each of the gear contacting members includes axially extending flanges having openings 46a to provide clearance for the pinion 31a. A plurality of compressed coil springs 47a extend longitudinally between the contacting members 45a and urge them axially outwardly. This axial loading is transmitted to the side gears which are axially movable on the shafts $S_3$. The side gears, in turn, transmit the axial force to the clutch members 35a which are also splined to the shafts $S_3$ and consequently are free to move axially into frictional engagement with the conical friction surfaces on the inserts $I_3$.

This initial frictional engagement of the clutch members 35a with the inserts $I_3$, provided by the spring pack P, is increased generally as a function of the torsional input to the mechanism casing $C_3$ by the bevel gear system $G_3$ as in the previously described embodiment.

The conical drum or seat surfaces frictionally engaged by the clutch members 35a are provided by the removable cone seat inserts $I_3$ which form the friction surfaces of the clutches $F_3$ associated with the casing $C_3$.

These inserts include a generally conically shaped wall portion 53a, the interior of which includes a conical seat surface 54a engaged by the clutch member 35a. The inserts $I_3$ may be formed of any suitable material such as, for example, steel, and may be made by any one of several manufacturing processes such as stamping, turning, spinning, grinding, etc.

The convergent end of the conical wall 53a of each insert terminates in a radially directed annular ring 75 disposed in contact with the axial stop surface of the casing $C_3$ to axially position the insert with respect to the casing.

The divergent end of each conical wall 53a is provided with a generally radially directed rim 77 which terminates in a generally cylindrical pilot surface 57a which is in circumferential contact with the cylindrical surface 73 of the casing $C_3$. This circumferential contact serves to radially position the insert $I_3$ with respect to the casing.

To effect driving engagement of the inserts $I_3$ with the casing upstanding drive tabs 59a are provided which extend radially outwardly of the rim 77 into the side port openings 19a. These flanges include transverse ends which engage the longitudinal walls 20a of the side ports to provide the required driving engagement between the inserts and the casing.

The number of flanges, and consequently the number of side ports used is, of course, optional. A plurality of drive flanges, equally spaced about the rim 77 and an equal number of side ports positioned about the cylindrical walls 15a of the casing $C_3$ provide for equal distribution of the forces created by transmission of torque from the casing $C_3$ to the shafts $S_3$ through the clutches $F_3$.

Each insert $I_3$ is provided with a plurality of lubricating orifices 63a to supply lubrication to the spirally progressing groove of the clutch member 35a. These orifices are disposed longitudinally along the insert conical wall 53a in one or more rows as desired. Lubricant from within the cavity 17a of the casing $C_3$ may pass through these orifices into communication with the spiral grooves 37a for distribution to the frictionally engaged surfaces.

Application of axial force upon the clutch members 35a is accomplished in two ways, as in the embodiment of FIGURES 1 and 2.

While the embodiment of FIGURE 3 shows the differential casing $C_3$ as being formed of separate casing halves 65 and 67, it is contemplated that a single piece casing, such as the casing C of the embodiments of FIGURES 1 and 2, could be used in conjunction with an inert having a single tab 59a or with a plurality of tabs and ports appropriately disposed about the wall 15a. The interior of the casing would, of course, have to be modified slightly to provide the necessary axial and radial piloting surfaces to position the inserts within the casing.

In FIGURES 4 and 5, there is shown an alternate arrangement for providing an initial preload upon the clutch members wherein the clutches may be placed in frictional engagement prior to installation within the mechanism casing. Though only a portion of the mechanism is shown in FIGURE 4, it may be assumed that the structure is generally symmetrical with respect to the pinion pin, except for the provision of a ring gear flange upon one transverse wall of the casing.

In this embodiment, a differential mechanism generally designated $D_4$ is provided which is generally similar to the mechanism D of FIGURE 1.

A casing $C_4$ is disposed in surrounding relation to the adjacent ends of a pair of relatively rotatable coaxially aligned output shafts $S_4$ and is connected thereto through a bevel gear system $G_4$. Friction clutches $F_4$, each of which includes a cone seat insert $I_4$, provide the desired resistance to differential action.

The casing $C_4$ includes a pair of spaced apart transverse walls 11b each of which is provided with a cylindrical pilot shoulder 21b and an axial stop surface 22b to effect radial and axial positioning of the inserts $I_4$.

The transverse walls are connected by a generally cylindrical wall 15b provided with a plurality of side ports 19b having longitudinally extending side wall surfaces 20b disposed in circumferentially spaced apart relation (see FIGURE 5). It is contemplated that the casing be constructed of separate halves and that the side ports be formed at the abutting ends of the casing halves from generally rectangular mating openings in each half.

The bevel gear system $G_4$ includes side gears 27b, pinion gears 29b and a pinion pin 31b which are connected between the casing $C_4$ and the output shafts $S_4$ in a manner similar to the embodiment of FIGURES 1 and 2 and operate accordingly to effect transmission of rotational effort to the output shafts.

The clutches $F_4$ include clutch members 35b which are generally similar to the clutch members 35 of FIGURES 1 and 2. Each clutch member includes a generally radially directed annular face 78.

The cone seat inserts $I_4$ include a generally conical wall 53b defining a conical seat surface 54b for engagement by the conical clutch member 35b. The convergent end of the conical wall 53b of each insert is provided with a radially inwardly directed flange 55b which includes a cylindrical pilot surface 57b disposed in overlying relation to the cylindrical pilot shoulder 21b to radially position the insert within the casing and further includes an outer surface 58b disposed in contacting relation with the axial stop surface 22b to axially position the insert within the cavity.

The divergent end of the conical wall 53b is provided with a plurality of drive tabs 59b which include longitudinally directed portions 79 and radially directed upstanding portions 81. The upstanding portion 81 of each of the drive tabs includes generally transverse ends which contact the longitudinal side wall surfaces 20b of the side ports 19b to effect driving engagement between the casing $C_4$ and the cone seat inserts $I_4$.

To provide the initial preload of the clutch members and cone seat inserts, a clutch member contacting member 83 is operatively associated with each insert $I_4$.

Each contacting member 83 includes a radially directed annular ring 85 in radial contact with the face 78 of the clutch member 35b. A reaction tab 87 extends axially outwardly of the ring 83 adjacent each of the tabs 59b of the insert $I_4$ with which the contacting member is associated.

The reaction tab includes an upstanding portion 89 disposed within the side port in spaced apart facing relation to the upstanding portion of the drive tab 59b. Compressed coil springs 47b are positioned between the tabs disposed in each side port urging them in an axially separating direction. As the ring 85 of each contacting member 83 is in contact with the face 77 of one of the clutch members 35b, the spring force is transmitted to the clutch members effecting initial frictional engagement with the conical seat surfaces 54b.

In the embodiment shown, the number of side ports and consequently the number of drive tabs 59b and reaction tabs 87, is optional. A plurality of each, equally spaced about the casing wall 15b is most desirable for equalization of the applied load upon the frictionally engaged members, is thereby accomplished. In FIGURE 5, an insert having four such tab and spring arrangements is shown.

In assemblying the mechanism the preload of the clutches $F_4$ may be effected prior to assembly of the inserts and clutch members within the mechanism. The inserts are disposed in overlying relation to the clutch members and the contacting members 83 are positioned with the annular rings 85 in contact with the faces 78 of the clutch members. The springs 47b are then compressed and positioned between the tabs 59b and 89 to effect frictional engagement of the inserts $I_4$ and the clutch members.

The inserts are then positioned within the casing with the tabs disposed within the side ports 19b to effect driving engagement of the inserts with the casing $C_4$. The bevel gear system is then installed to complete the assembly procedure.

In FIGURE 6, an alternate arrangement for providing frictional engagement between the inserts and clutch members is shown.

A differential mechanism $D_6$ including a casing $C_6$ having a plurality of side ports 19c is provided. Radial positioning of the inserts $I_6$ is effected by contact of cylindrical pilot surfaces 73c of the casing $C_6$ by radially directed rims 77c adjacent the divergent ends of the inserts $I_6$.

The inserts include upstanding drive tabs 59c at their divergent ends which engage longitudinally spaced side walls 20c of side ports 19c to effect driving engagement of the inserts and the casing. Clutch members 35c are disposed within the casing adjacent the side gears 27c of a bevel gear system $G_6$. The side gears are maintained in predetermined spaced apart relation by a thrust block 91. In a semi-floating or C washer axle arrangement, a thrust block such as the thrust block 91 would not be necessary. In such a construction, the shafts would be retained in spaced apart relation by the pinion pin and the C washers which are normally positioned in grooves formed in the shafts and disposed in radial contact with the side gears would prevent the side gears from moving outwardly from the pinion pin.

Compressed coil springs 47c are disposed within each of the side ports between a transverse wall 93 of the side port and the upstanding drive tab 59c of the inserts $I_6$. The springs urge the inserts inwardly and as the clutch members 35c and side gears 27c can move only a predetermined distance because of the thrust block 91, frictional engagement of the inserts and clutch members is effected.

As in the previously described embodiments, application of torque to the casing $C_6$ creates axial separation force upon the side gears 27c which serves to increase frictional engagement of the clutches to provide increased resistance to differential action. Therefore, axial positioning of the inserts is necessary to utilize these separating forces. In FIGURE 6 stop pins 95 are provided in each of the side ports to prevent further movement of the inserts outwardly because of the side gear separating forces. Alternatively, a stop shoulder such as the shoulder 97, also shown in FIGURE 6, could be used which would engage the rim 77c of the insert to prevent further axial movement.

Again, the number of side ports 19c and drive tabs 59c can be varied without departing from the scope of the invention.

In FIGURES 7 and 8, there is shown still another arrangement for effecting the initial preload of the cone seat inserts utilizing drive tabs which engage side ports to provide a driving relationship between the inserts and the differential casing.

In this embodiment, a casing $C_7$ is provided which includes a plurality of side ports 19d having longitudinally extending spaced apart walls 20d. A pair of cone seat inserts $I_7$ are provided which are frictionally engaged by a pair of clutch members 35d. The inserts include drive tabs 59d which have longitudinally extending portions 79d which extend toward the center of the mechanism and upstanding portions 81d disposed within the side ports 19d, adjacent the opposite insert $I_7$. These upstanding portions engage the surfaces 20d of the side port openings to provide driving engagement of the inserts with the casing $C_7$.

Compressed coil springs 47d are disposed within the side ports intermediate the upstanding portions 81d urging them in a direction away from each other. This causes the inserts to tend to move toward each other, and consequently toward the clutch members 35d. A pair of side gears 27d are disposed intermediate the clutch members 35d and are positioned in predetermined spaced apart relation by a thrust block 91d. Therefore, the spring force upon the upstanding tabs is effective to cause frictional engagement of the inserts with the clutch members.

To utilize the axial separation forces available from the bevel gear system upon torque application to the mechanism, the convergent ends of the inserts are provided with radially directed faces 78d which contact axial stop surfaces 22d to axially position the inserts. The axial separating forces transmitted by the side gears to the clutch members are therefore effective to provide increased resistance to differential action.

Figure 9:
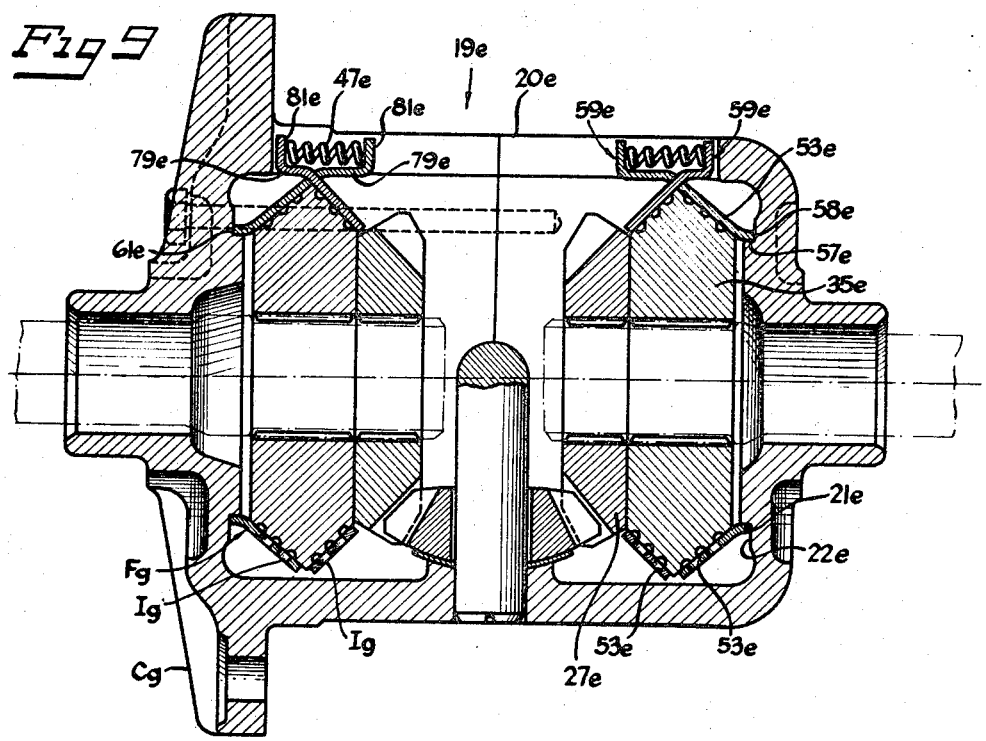
FIGURE 9 is a fragmentary, revolved sectional view of an alternate form of the invention showing a modified clutch arrangement for providing resistance to differential action.
Figure 10:
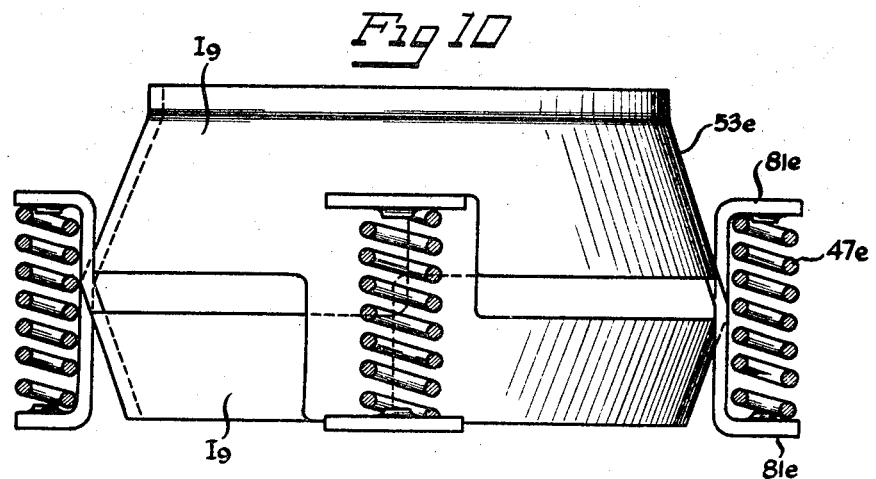
FIGURE 10 is a view of a portion of the apparatus of FIGURE 9 showing particular details of that embodiment of the invention.

The embodiment of FIGURES 9 and 10 is generally similar to that of FIGURES 7 and 8, except that the conical clutches are replaced by clutches $F_9$ which have opposed conical surfaces and the inserts $I_9$ include two conical walls 53e with their divergent ends in juxtaposed relation overlying the clutch members. Upstanding drive tabs 59e are provided which are connected to the conical walls 53e by longitudinally extending portions 79e. The upstanding tabs include transverse ends which engage longitudinal side walls 20e of side ports 19e to provide driving engagement between the inserts and the casing.

Compressed coil springs 47e are disposed between the upstanding portions 81e of the drive tabs 59e of each clutch set to urge the conical walls into frictional engagement with the clutch members 35e.

The casing $C_9$ includes cylindrical pilot shoulders 21e and axial stop surfaces 22e to radially and axially position the clutches within the casing by contact with cylindrical pilot surfaces 57e and radially directed rings 58e formed on the conical walls 53e of the insert sets $I_9$.

A beval gear system is provided which includes side gears 27e in radial contact with the clutch members 35e and which serve to urge the clutches into increased frictional engagement upon application of driving torque to the mechanism.

Various features of the invention have been particularly shown and described, however, it should be obvious to one skilled in the art that various modifications may be made without departing from the scope of the invention.

What is claimed is:

1. An insert for a limited slip differential mechanism comprising: means defining a generally conical seat surface for engagement by a conical clutch member; at least one generally radially directed upstanding drive tab adjacent the divergent end of said conical seat surface including transverse ends to effect driving engagement.

2. An insert for a limited slip differential mechanism comprising: a generally conical wall defining a conical seat surface; at least one generally radially directed upstanding drive tab abjacent the divergent end of said conical wall including transverse ends to effect driving engagement; and a radially directed flange adjacent the convergent end of said conical wall having a generally cylindrical pilot surface to radially position said insert and a generally radially directed surface laterally adjacent said cylindrical pilot surface to axially position said insert.

3. An insert for a limited slip differential mechanism comprising: means defining a generally conical seat surface for engagement by a conical clutch member; a generally radially directed rim extending outwardly adjacent the divergent end of said conical wall having a generally cylindrical surface to radially position said insert and at least one generally radially directed upstanding tab extending outwardly of said rim and including transverse ends to effect a driving relationship and said conical wall terminating in a generally radially directed annular ring surface to axially position said insert.

4. An insert for a limited slip differential mechanism comprising: means defining a generally conical seat surface for engagement by a conical clutch member; a generally radially directed rim extending outwardly adjacent the divergent end of said conical wall having a generally cylindrical surface to radially position said insert and a pair of upstanding drive tabs circumferentially spaced apart about said rim in equal increments and including transverse ends to effect a driving relationship and said conical wall terminating in a generally radially directed annular ring surface to axially position said insert.

5. An insert for a limited slip differential mechanism comprising: means defining a generally conical seat surface for engagement by a conical clutch member; a generally radially directed rim extending outwardly adjacent the divergent end of said conical wall having a generally cylindrical surface to radially position said insert and at least two generally radially directed upstanding tabs extending radially outwardly of said rim and including transverse ends to effect a driving relationship.

6. A preloaded clutch sub-assembly for a differential mechanism comprising: a removable cone seat insert including a conical wall defining a conical seat surface, at least two generally radially directed upstanding drive tabs adjacent the divergent end of said conical wall including transverse ends to effect driving engagement; a conical clutch member disposed in contact with said conical seat surface of said insert said clutch member including a generally radially directed annular face adjacent its divergent end; and means urging said clutch member into a predetermined frictional engagement with said conical seat surface including, a clutch contacting member having a generally annular contacting ring disposed in radial contact with said annular face of said clutch member, at least two reaction tabs each of which is disposed adjacent one of said upstanding drive tabs of said insert and includes an upstanding portion disposed in spaced apart relation to said drive tab, and a compressed coil spring disposed between each pair of said drive tabs and reaction tabs effective to urge said clutch contacting member toward said insert to effect said predetermined frictional engagement between said clutch member and said conical seat surface of said insert.

7. A preloaded clutch sub-assembly for a differential mechanism comprising: a removable insert including a pair of generally conical members disposed with their divergent ends in juxtaposed relation each said conical member including at least two drive tabs having longitudinal portions extending outwardly of the divergent ends of said conical members in upstanding portions disposed in longitudinally spaced apart relation to the upstanding portions of the other of said conical members said upstanding portions including transverse ends to effect a driving relation; a clutch member disposed intermediate said conical members including a pair of conical surfaces in contact with the conical surfaces of said insert; and a compressed coil spring disposed between each of said pairs of upstanding portions of said tabs effective to urge said conical members toward each other to effect an initial predetermined frictional engagement of said clutch member and said conical members.

References Cited

UNITED STATES PATENTS

| | | | |
|---|---|---|---|
| 1,141,648 | 6/1915 | Mitchella | 192—107 X |
| 2,395,189 | 2/1946 | Lapsley et al. | 192—107 |
| 2,965,205 | 12/1960 | Winchell | 192—66 |
| 3,186,258 | 6/1965 | Meldola | 74—710.5 |

ARTHUR T. McKEON, *Primary Examiner.*